Patented July 4, 1950

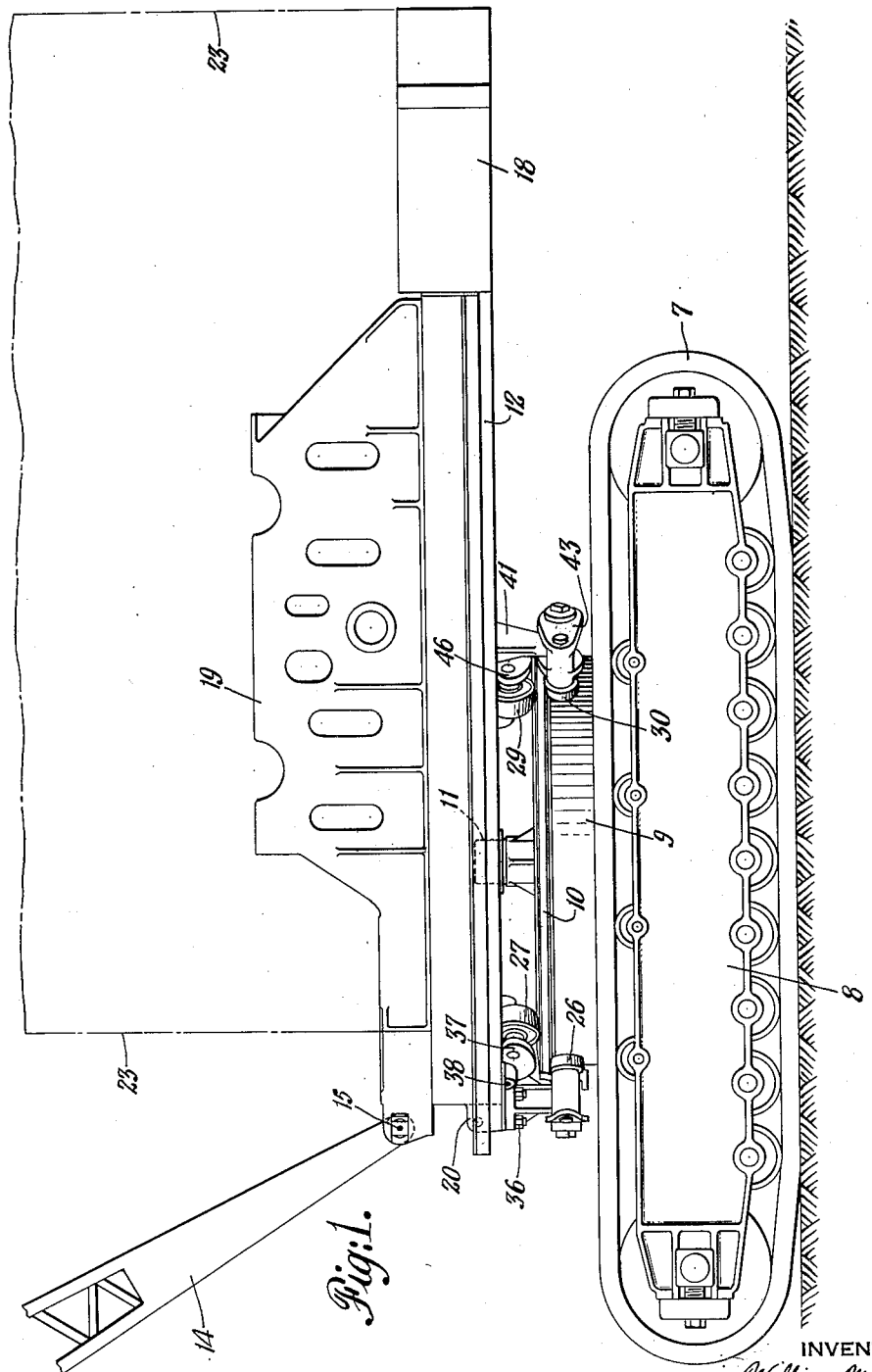

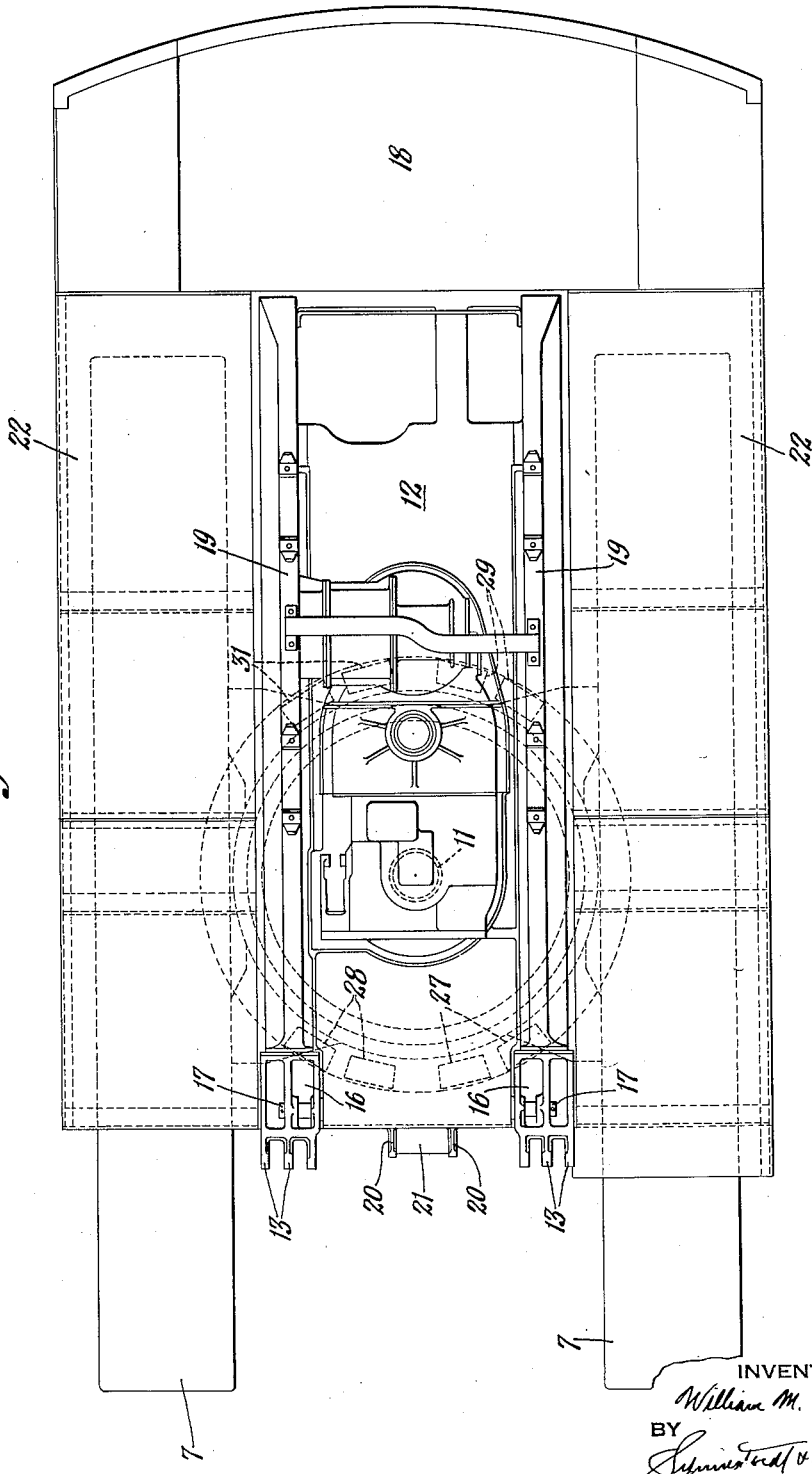

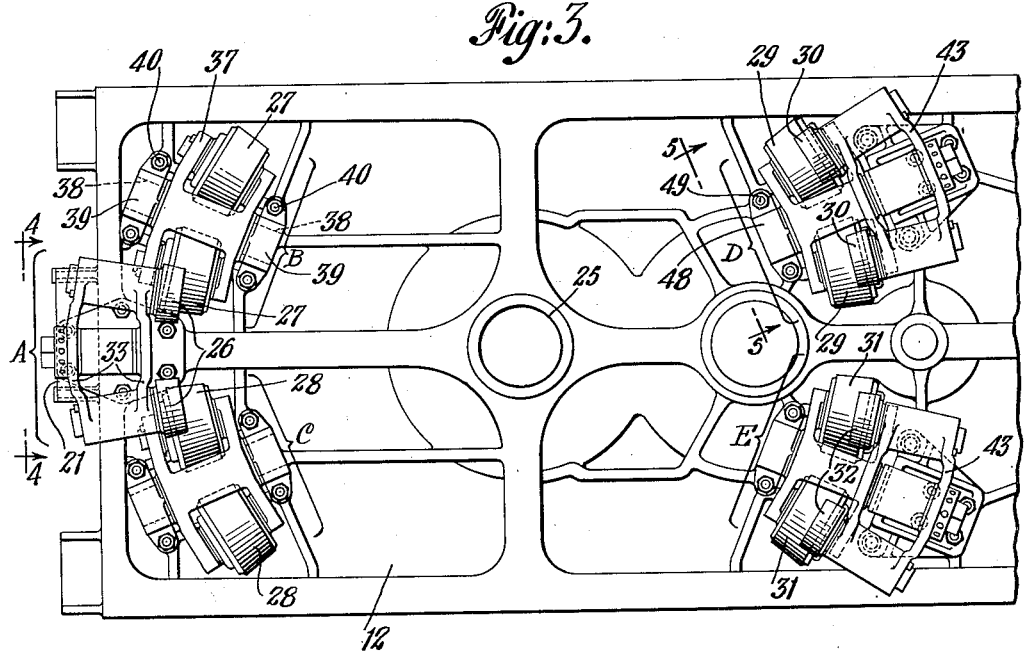
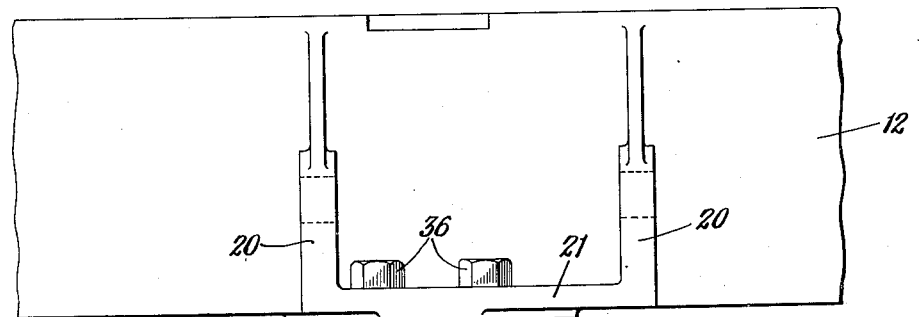
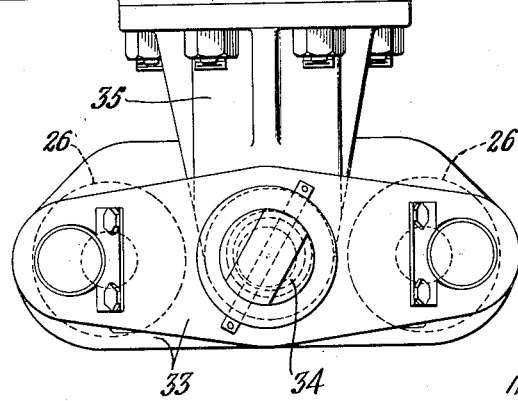

2,513,726

UNITED STATES PATENT OFFICE 2,513,726

LOAD HANDLING EQUIPMENT

William M. Huston, Lima, Ohio

Application July 5, 1945, Serial No. 603,379

12 Claims. (Cl. 212—69)

This invention relates to load handling equipment, such as cranes, shovels, drag-lines, etc., and more particularly to machines of these types which are mounted on crawler treads and provided with drive mechanism for travelling on the ground under their own power.

In load handling equipment of the types mentioned above, the rotating base of the machine, which carries the power plant, boom, operating machinery and the like, is customarily mounted on the crawler truck for swing motion. Such mounting includes a vertical center pin and a surrounding circular track, the track being arranged at the top of the crawler truck and the rotating base being provided with main and hook rollers which engage, respectively, the upper and lower surfaces of the circular track. The main rollers transmit the weight of the machine and the load handled thereby to the circular track and thus to the crawler truck, and the hook rollers prevent tipping of the rotating base with respect to the truck. In machines of large size, such as contemplated according to the present invention, the loads transmitted through the main and hook rollers to the circular track of the crawler truck are very heavy.

The present invention has as its primary object a novel arrangement and mounting for main and hook rollers, which arrangement is such as to effectively handle and distribute the heavy loads encountered in large size load handling machines.

More specifically, the invention contemplates the employment of main and hook rollers, with main rollers grouped in a plurality of pairs and hook rollers also grouped in pairs, and with the two rollers of each pair of each type mounted by an equalizer arm or lever, whereby to effect equalized distribution of loads.

In considering another feature of the invention, it is first mentioned that the load handling boom or the like of the machine is customarily pivoted to the front edge of the rotating base. Therefore, the heaviest loads are transmitted to the circular track through the main rollers in the region of the front edge of the rotating base, the loads to be carried through the hook rollers at the front edge being relatively small. On the other hand, when the boom is handling a heavy load, very substantial forces are required to be transmitted through the hook rollers to the circular track in the region offset to the rear of the center of swing motion, i. e., on the rearward portion of the circular track. With these loading factors in mind, the invention contemplates the employment of four pairs of main rollers, two of which are arranged in the region ahead of the center of swing motion and two in the region to the rear of the center of swing motion; whereas only three pairs of hook rollers are provided, one of which is located forwardly of the center of swing motion and the other two to the rear of the center of swing motion, adjacent to but below the rear pairs of main rollers. By virtue of this general pattern of main and hook rollers, all of the loads and forces are effectively carried, equalized and distributed, even in machines of very large size.

The invention further provides means for adjustment for initial installation and for take-up of wear, cooperating with the roller mounts in a manner to equalize the adjustment as between rollers of the pairs.

In accordance with another aspect of the invention, a pair of main rollers and a pair of hook rollers are mounted in common on the rotating base of the machine, a common mounting bracket being provided for this purpose. This common mounting of pairs of main and hook rollers facilitates location of main and hook rollers in a closely clustered group, with main rollers and hook rollers in superimposed relation, above and below the circular track.

Beyond the foregoing, the invention contemplates a novel mounting for a pair of rollers, particularly the front pair of hook rollers above referred to, by means of a bracket connected with a support which also serves to carry mechanism adapted to perform a working function in association with a fairlead for dragline attachment.

How the foregoing and other objects and advantages are attained will be clear from the following description referring to the accompanying drawings which illustrate the preferred embodiment of the invention and in which—

Figure 1 is a side elevational view of the crawler truck and rotating base of a load handling machine equipped with main and hook rollers in accordance with the invention, the power plant, machinery, cab, etc., which are ordinarily carried by the rotating base, being omitted;

Figure 2 is a top plan view of the structure shown in Figure 1;

Figure 3 is a view on an enlarged scale of a portion of the underside of the rotating base, showing the arrangement of main and hook rollers mounted on the base;

Figure 4 is a front elevational view on a further enlarged scale of the front pair of hook rollers and the mounting thereof on the base, this view being taken looking toward the right in Figure 3, as indicated by the line 4—4, but with the parts shown right side up, as in Figure 1;

Figure 5:
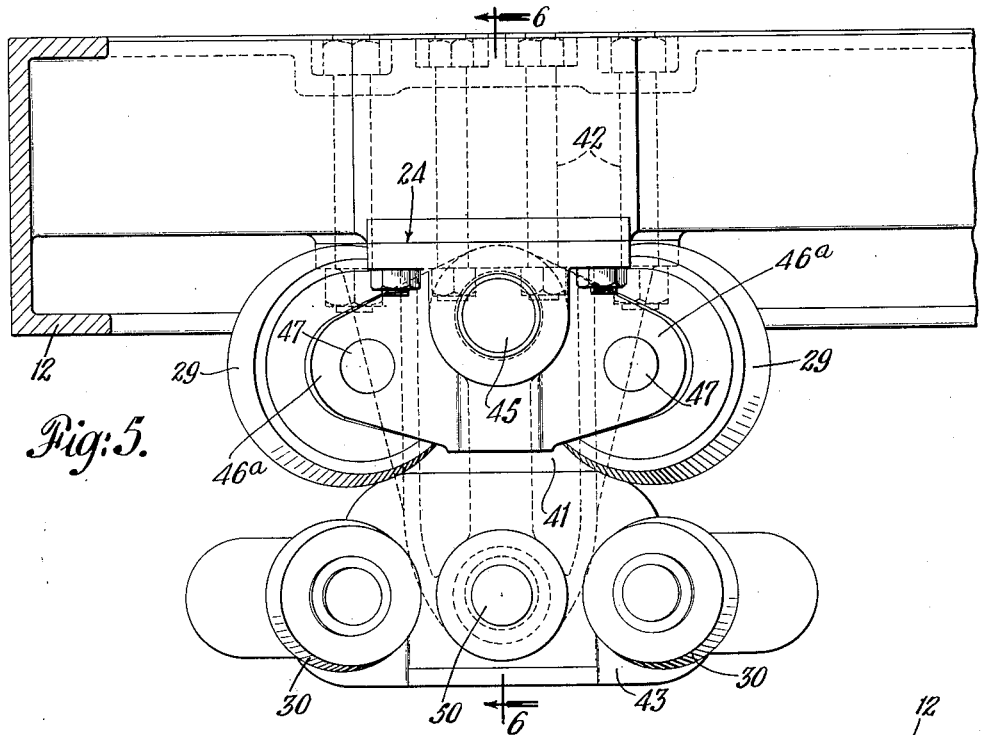
Figure 5 is a view of one of the rear groups of main and hook rollers which are mounted in common, the view being taken looking in the direction of the line 5—5 on Figure 3, but with the parts right side up.

Referring first to Figures 1 and 2, the machine is provided with a pair of crawler treads diagrammatically indicated at 7—7, these treads being mounted by means of a crawler truck 8 having an upwardly extending cylindrical portion 9 at the upper edge of which is the circular track 10 (see also Figure 6), concentric with the upright shaft 11 and defining the axis of swing motion of the rotating base 12 on the truck. A truck drive transmission, and controls therefor, are carried downwardly from the rotating base to the truck structure, as is known in this art, but these features need not be considered herein since they form no part of the present invention per se.

Before describing the arrangement of main and hook rollers which are associated with the circular track 10, brief reference is made to some of the general features of the rotating base and structures which are carried thereby. At the front edge of the rotating base (toward the left as viewed in Figures 1 and 2) the base is provided with pairs of apertured ears 13—13 to which the foot end of the load handling boom 14 is adapted to be pivoted as indicated at 15 in Figure 1. As seen in Figure 2, the rotating base also is provided with pockets 16—16 arranged to receive the lower forward ends of the front gantry legs, these legs being secured in the pockets by means of pins such as shown at 17—17.

Toward the rear end of the rotating base one or more counter-weights 18 are mounted, and in this region the rotating base is adapted also to support the engine (not shown). Transversely spaced upright machinery frames 19—19 are carried by the rotating base, the machinery frames serving to mount various units of the operating machinery such as hoist drums, gearing, brakes, clutches, and the like.

At the front edge of the rotating base (below the line of pivoting of the boom 14), a fair-lead bracket is provided including a pair of apertured ears 20 projecting forwardly of the main structure of the rotating base, and a horizontal interbracing web 21 disposed substantially in the plane of the bottom of the rotating base (see also Figure 4). As is brought out more fully hereinbelow, the web 21 not only serves its function of bracing of the fair-lead bracket, but in addition serves as a supporting pad to which a mounting bracket for a pair of hook rollers is bolted.

With respect to the general structure of the rotating base itself, it is pointed out that the central portion of the rotating base advantageously comprises a unitary casting of width slightly less than the distance between the crawler treads 7—7 (see Figure 2), this main casting of the rotating base being extended from the forward edge (adjacent the region of mounting the boom) rearwardly a distance sufficient to provide for support of counterweight 18. As shown in Figure 2, platform-like lateral extensions 22—22 are secured to the central base casting; and a cab structure, the outline of which appears at 23 in Figure 1, is built up on the rotating base as a whole, to enclose the machinery, power plant, etc.

Figure 6:
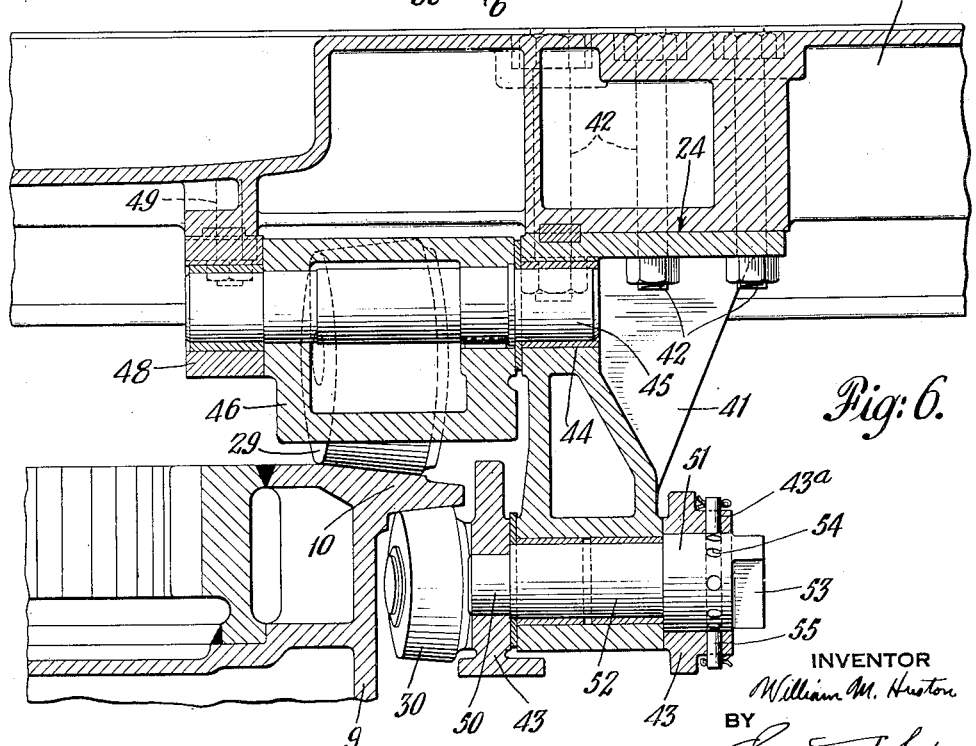
Figure 6 is a vertical sectional view of the structure shown in Figure 5, the view being taken as indicated by the section line 6—6 on Figure 5.

By reference particularly to Figures 3, 5 and 6, it will be seen that the central base casting is provided with various bracing webs and also with pads, one of which appears at 24 in Figure 6 on which the brackets for the main and hook rollers are mounted. Such pads are provided for the mounting brackets for each of several groups of main and hook rollers designated in Figure 3 by brackets A, B, C, D and E. As is seen from the drawings, these several groups of rollers are clustered around the pin aperture 25 in the base casting which serves to receive the center pin 11 defining the axis of swing motion of the rotating base on the truck. Group A includes a pair of equalized hook rollers 26. Groups B and C each include a pair of main rollers 27—27 and 28—28, respectively. Group D includes a pair of main rollers 29—29 and a pair of hook rollers 30—30; Group E similarly including both main and hook rollers 31—31 and 32—32, respectively.

The forward central pair of hook rollers 26 (group A) are shown on an enlarged scale in Figure 4 and from this figure it will be seen that the rollers 26 are mounted toward opposite ends of an equalizer beam 33, which beam is pivoted intermediate its ends by a pivot 34 to the lower end of a mounting bracket 35. Bracket 35 has a base surface which abuts a pad formed in part on the horizontal web 21 of the fair-lead bracket and in part on the adjacent structure of the base casting, the bracket being secured by means of bolts indicated at 36.

The main rollers 27 of group B (see Figures 1 and 3) are also mounted on an equalizer 37 which is pivoted at 38 in bearing blocks 39—39, the latter being bolted to the base casting as shown at 40. The mounting of main rollers 28 in group C is effected in the same manner as just described for rollers 27.

Roller groups D and E are counterparts and only one of them need therefore be described, for which purpose reference is made to Figures 5 and 6 illustrating the rollers in group D and the mounting thereof. In this group a mounting bracket 41 has a base surface abutting the pad 24 on the basecasting, the bracket being secured by means of bolts 42. Toward the lower end of bracket 41 an equalizer 43 serves to carry the pair of hook rollers 30, these hook rollers riding on the underface of the circular track 10, as clearly appears in Figure 6. Bracket 41 also has a bearing aperture 44 adapted to cooperate with one end of the mounting pivot 45 for the equalizer 46, which serves to carry the pair of main rollers 29. As shown, the equalizer 46 (Fig. 6) for this pair of main rollers 29 is provided with pairs of apertured projecting ears 46a between which each main roller 29 is mounted by a pin 47 (as seen in Fig. 5). From Figure 6 it will also be seen that the equalizer mounting pin 45 is supported not only in the bearing aperture 44 of the bracket 41, but also by a bearing block 48 secured to the base by means of bolts 49 (see also Figure 3). Thus the equalizer pin 45 for the rollers 29 is effectively supported at both ends. With the arrangement just described, it will be seen that the bracket 41 serves to support both main and hook rollers in common, and this feature facilitates the location of the pairs of main and hook rollers included in each one of the groups D and E in close association with each other, there being a hook roller located substantially directly below each of the main rollers 29 and 31.

In accordance with a further feature of the invention, the equalizer arm for each pair of hook rollers (in groups A, D and E) is mounted on a pivot or fulcrum which is adjustable in a manner to effect raising or lowering of the axis of the equalizer fulcrum. This feature is employed to compensate for the wear on the rollers and/or on the circular track, as well as for initial setting of the rollers. The manner in which this is accomplished will be clear from the following description referring to Figure 6.

As above mentioned, the pair of hook rollers 30—30 are mounted on an equalizer 43, the central portion of which is of open box construction, with the lower end of the supporting bracket 41 projecting downwardly into the box opening. The equalizer mounting pin has end portions 50 and 51 which are received in apertures formed in the side walls of the central box portion of the equalizer. The portions 50 and 51, although of different diameters, are co-axial, so that the equalizer may pivot about the pivot axis 50—51. The intermediate portion 52 of the fulcrum pin (which is received in the bearing aperture at the lower end of the bracket 41) is eccentric with respect to the axis of portions 50—51. Rotation of the fulcrum pin, therefore, raises or lowers the axis of the portions 50—51, and this rotative adjustment is facilitated by the provision of a flattened outer end portion 53 on the equalizer pivot, so that a tool or wrench may readily be applied, to effect the adjustment. The portion 51 of the pin is also provided with a series of diametrically extending bores 54 angularly offset from each other about the axis of the pin and cooperating with a pair of diametrically aligned apertures formed in an adjacent portion 43a of the equalizer, to receive a removable securing pin 55, whereby any adjusted setting of the fulcrum pin may be fixed.

An eccentric adjusting pin of this type is employed for mounting the equalizer of each pair of hook rollers 26, 30 and 32.

Turning again to Figure 3, it will be seen that the main rollers 27, 28, 29 and 31 are grouped in four pairs which are symmetrically arranged about the axis of swing motion, there being a pair located toward the front edge of the rotating base at each side of the longitudinal vertical midplane thereof. Similarly two of the pairs (29 and 31) are disposed to the rear of the center of swing motion, one being offset a little to one side and the other a little to the other side of said longitudinal vertical mid-plane. This disposition of the main rollers effectively distributes and transmits the main loads from the rotating base to the circular track.

It will also be observed that each of the roller groups D and E not only incorporates a pair of main rollers but further includes a pair of hook rollers so mounted and positioned as to form a compact group or cluster. The employment of two pairs of hook rollers to the rear of the axis of swing motion adequately distributes and transmits to the circular track many of the hook roller forces, such for instance as those encountered upon the lifting of a heavy load, with accompanying tendency to tilt the rotating base forwardly.

The forward group of hook rollers (group A) is centrally arranged at the forward edge of the rotating base, and here also it will be observed that each of the hook rollers 26 underlies a main roller of the two groups mounted in this region.

I claim:

1. In a load handling machine having a crawler truck with a circular track and a rotating base mounted for swing motion on said track, a roller supporting bracket secured to the rotating base, main and hook rollers adapted to ride on said track and receiving support in common from said bracket, an equalizer arm pivotally mounted on the bracket and carrying a pair of rollers of like kind, and adjustment means operatively interposed between the equalizer pivot and the supporting bracket and providing for vertical adjustment of the hook rollers relative to the main rollers.

2. In a load handling machine having a crawler truck with a circular track and a rotating base adapted to carry a boom at the front edge thereof, the base being mounted for swing motion on said truck, roller mechanism mounted on the rotating base and comprising two roller equalizers adjacent the front edge of the base, each equalizer carrying a pair of main rollers adapted to ride on the track, which pairs are positioned close to but at opposite sides of the longitudinal vertical midplane of the rotating base, hook roller means mounted adjacent the front edge of the rotating base and centered with respect to said longitudinal vertical midplane, and opposed pairs of main and hook rollers mounted on the rotating base and disposed to the rear of the axis of swing motion substantially diametrically opposite the first mentioned pairs of main rollers.

3. A construction in accordance with claim 2 in which the main and hook rollers to the rear of the axis of swing motion are arranged in groups symmetrically disposed with relation to the longitudinal vertical midplane of the machine, the group at each side comprising a pair of equalized main rollers and a pair of equalized hook rollers.

4. A construction in accordance with claim 2 in which the main and hook rollers to the rear of the axis of swing motion are arranged in groups symmetrically disposed with relation to the longitudinal vertical midplane of the machine, the group at each side comprising a pair of equalized main rollers and a pair of equalized hook rollers, together with a bracket secured to the rotating base and serving as a mount common both to main and hook rollers of one of said groups.

5. In a load handling machine having a crawler truck with a circular track and a rotating base mounted for swing motion on said track, a roller supporting bracket secured to the rotating base and projecting downwardly therefrom, main and hook rollers supported in common by said bracket, there being a hook roller mounting pin supported in a lower portion of the bracket and a main roller mounting pin journalled at one end in an upper portion of the bracket, together with bearing means independent of said bracket for mounting the other end of the main roller pin on the rotating base.

6. In a load handling machine having a rotating base and a circular track on which said base is mounted for swing motion, paired rollers mounted on said base and operatively associated with said track, equalizer means operatively interposed between the rotating base and the rollers of a pair, and means associated with the equalizer means and providing for vertical roller adjustment of both rollers of a pair through the intermediation of said equalizer means.

7. In a load handling machine having a rotating base and a circular track on which said base is mounted for swing motion, paired rollers mounted on said base and operatively associated with said track, equalizer means operatively interposed between the rotating base and the rollers of a pair, and means operatively interposed between the rotating base and the equalizer means and providing for vertical adjustment of said equalizer means.

8. In a load handling machine having a crawler truck with a circular track, a rotating base structure having a roller supporting bracket to which two equalizer arms are pivotally connected, a pair of main rollers being mounted on one equalizer arm and a pair of hook rollers being mounted on the other equalizer arm, there being a main roller substantially directly superimposed over each hook roller.

9. In a load handling machine having a crawler truck with a circular track and a rotating base mounted for swing motion on said track, main and hook rollers mounted on the rotating base and adapted to ride on said track, a roller supporting bracket secured to the rotating base, an equalizer arm pivotally mounted on the bracket and carrying a pair of rollers of like kind, and roller adjustment means associated with the bracket and operative to effect relative vertical adjustment as between main and hook rollers supported in common by said bracket.

10. A construction according to claim 1 in which the pivotal mounting of the equalizer arm comprises a rotationally adjustable pin, a portion of the pin being journaled in the equalizer arm, and another portion, eccentric with respect to the axis of the first mentioned portion, being journaled in the bracket, and releasable means for securing the pin in different positions of rotational adjustment.

11. In a load handling machine having a crawler truck with a circular track and a rotating base being mounted for swing movement on said truck, a bracket projecting forwardly of the front edge of the rotating base comprising a pair of apertured ears and a horizontal interbracing web interconnecting the ears, a roller supporting bracket connected with said web, and a pair of hook rollers mounted on the bracket in a position to ride on the circular track of the truck.

12. In a load handling machine having a crawler truck with a circular track and a rotating base adapted to carry a boom at the front edge thereof, the base being mounted for swing movement on said truck, roller mechanism mounted on the rotating base and comprising two roller equalizers adjacent the front edge of the base, each equalizer carrying a pair of main rollers adapted to ride on the track, which pairs are positioned close to but at opposite sides of the longitudinal midplane of the rotating base, hook roller mounting means adjacent the front edge of the machine centered with respect to said longitudinal vertical midplane, and a pair of hook rollers mounted on said mounting means, each hook roller being disposed substantially beneath a main roller.

WILLIAM M. HUSTON.

REFERENCES CITED

The following references are of record in the file of this patent:

UNITED STATES PATENTS

| Number | Name | Date |
|---|---|---|
| 518,901 | Sherman | Apr. 24, 1894 |
| 1,043,826 | Harris | Nov. 12, 1912 |
| 1,289,427 | Ferris | Dec. 31, 1918 |
| 1,486,191 | Marshall | Mar. 11, 1924 |
| 1,891,995 | Marcy | Dec. 27, 1932 |
| 1,929,397 | Davidson | Oct. 3, 1933 |
| 2,139,960 | Kauffman | Dec. 13, 1938 |
| 2,144,760 | Harnischfeger | Jan. 24, 1939 |
| 2,264,231 | Backer et al. | Nov. 25, 1941 |
| 2,366,558 | Rauch | Jan. 2, 1945 |
| 2,408,378 | Davenport et al. | Oct. 1, 1946 |